Feb. 13, 1951     W. C. STARKEY     2,541,947
SPRING TYPE OVERLOAD RELEASE DEVICE
Filed July 22, 1946
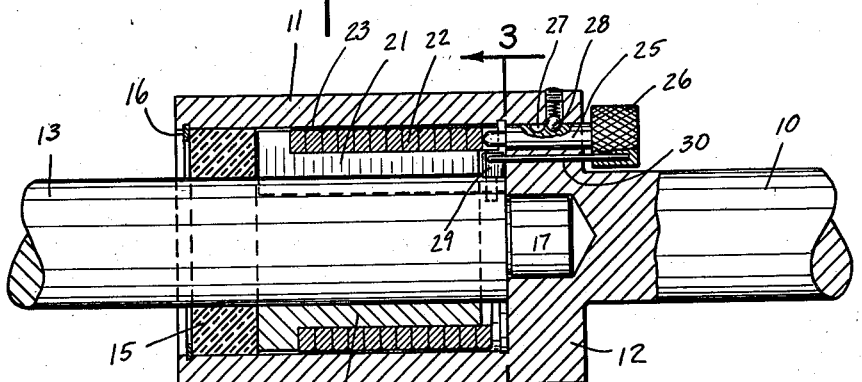
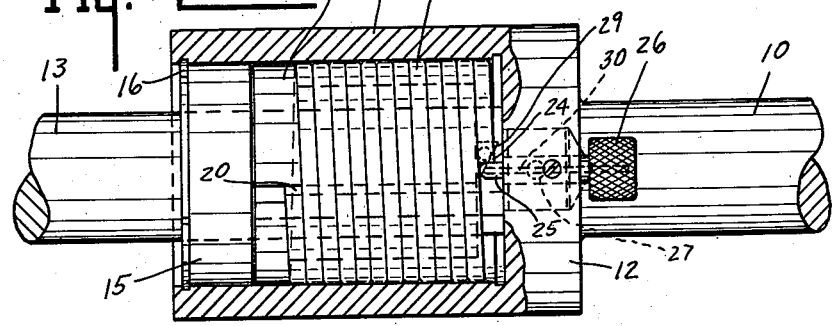
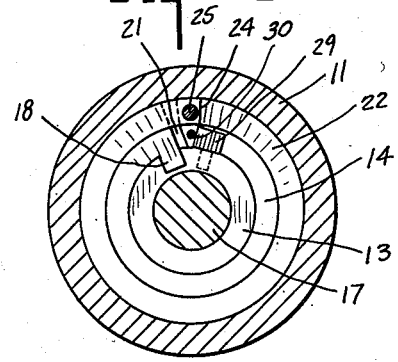
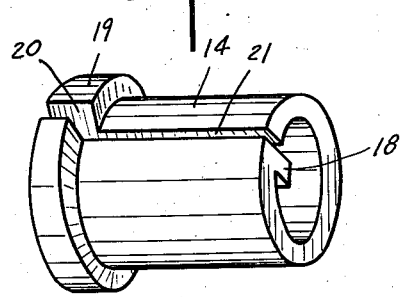
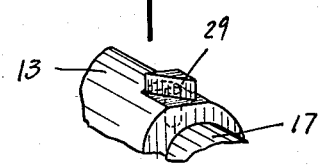
INVENTOR.
WILLIAM CARLETON STARKEY.
BY
Lockwood, Goldsmith & Galt.
ATTORNEYS.

Patented Feb. 13, 1951

2,541,947

UNITED STATES PATENT OFFICE 2,541,947

SPRING TYPE OVERLOAD RELEASE DEVICE

William Carleton Starkey, Indianapolis, Ind.;
Fletcher Trust Company executor of said William Carleton Starkey, deceased Application July 22, 1946, Serial No. 685,468

5 Claims. (Cl. 192—56)

This invention relates to an overload release device having many applications in respect to completely releasing a driving connection upon an overload being applied, and particularly in association with a spring clutch acting as the releasable driving connection between the driving and driven members.

The invention is particularly useful and applicable in power drives wherein there is danger of excessive resistance, clogging or other interference with the transmission of the driving power to the driven end of the drive. For example, as applied to the power drive for a stoker screw feed, in event of clogging thereof the overload release device will disconnect the screw from the driving motor to thus avoid breakage of parts or burning out of the motor. The device may be calibrated to effect the release when the overload reaches a maximum torque necessary to normally operate the feed screw but below that which would cause breakage of any of the driving parts or damage to the driving motor. Similar applications of the invention may be readily appreciated, particularly wherein there is involved a power drive which should be released in event of any occurrence which would overload the driving mechanism.

One feature of the invention resides in the simplified form of the overload release device wherein the load sensitive element which controls the release is in the form of a split band or collar. Any element which is subject to radial displacement when the overload torque is being applied, and which is mounted ahead of the load carrying portion of the clutch spring may be used to disengage the energizing coils of the clutch spring and thus produce the release.

Another feature of the invention resides in the simplified arrangement of a releasable driving pin operating in one position to engage and energize the clutch spring into clutching relation for connecting the driven member with the driving member, but readily releasable from its clutch energizing position to permit the clutch spring to become ineffective as a driving connection between said members.

A further feature of the invention resides in the unloading or clutch releasing means, here shown as a cam actuated retracting pin made effective to release the driving pin and spring clutch upon the load sensitive element permitting of relative rotation between the driving and driven members.

Another important feature of this invention is the ease with which the mechanism can be restored to operating condition without undue shock to any of the driving parts whenever it is thought the cause of overload has been removed.

Another feature is the ease with which a light can be made to flash or a buzzer to give warning at remote distance where equipment is not constantly attended, such as on stokers.

The full nature of the invention will be understood from the accompanying drawings and the following description and claims:

Fig. 1 is a central vertical section through the overload release device with portions in elevation.

Fig. 2 is a plan view of the device shown in Fig. 1 with parts broken away.

Fig. 3 is a section taken on the line 3—3 of Fig. 1.

Fig. 4 is a perspective view of the load sensitive element.

Fig. 5 is a perspective view of the unloading cam member.

In the drawings there is shown, by way of illustrating one modification of the invention, an overload torque release device including a driven member comprising a shaft 10, clutch pocket 11 and intermediate head portion 12. The driving member of said device comprises a driving shaft 13 having mounted thereon and keyed thereto a load sensitive element 14, as shown in Fig. 4. The element 14 is so designed and formed as to determine the overload torque which disconnects the driving and driven members. The driving shaft 13 extends into the pocket 11 of the driven member, being rotatably supported therein by the bushing 15. The bushing and element 14 are held therein by the locking ring 16. The free end of said shaft is reduced to provide a spindle 17 having its bearing in the head 12 of the pocket.

The load sensitive element is in the form of a split sleeve 14 carried by the shaft 13 within the pocket 11. Said sleeve has an inwardly extending key 18 interlocking with a corresponding key slot in the shaft 13. At one end of said sleeve there is provided a load carrying flange 19 of helical formation to provide a spring abutting shoulder 20. Said sleeve is split at 21 to permit expansion thereof under an overload, as hereinafter described.

Carried by the sleeve 14 within the pocket 11 there is a cylindrical helically formed clutch spring 22 having its load carrying end in abutment with the shoulder 20 provided on the flange 19 of the load sensitive element. Said spring is normally out of engagement with the inner cylindrical clutch surface 23 of the pocket 11, but lies in such close proximity thereto as to engage and clutch said pocket upon being expanded. The energizing end of said clutch spring, indicated at 24, lies adjacent the head 12 of the driven member in position to be engaged and energized to expanded clutching engagement with the pocket by a releasable driving pin 25 mounted in said head.

Said driving pin is slidable through said head inwardly to driving position and outwardly to releasing position. When in its inward driving position, it is engageable by the energizing end 24 of the spring. When in its outward releasing position, it is free from engagement thereby. Said pin carries a knurled head 26 for permitting the pin to be manually moved inwardly or outwardly, and is formed with a pair of detents 27 for latching engagement by a spring pressed latching ball 28. Thus, as said pin is moved toward its inner or outer positions, it will be held in its extreme positions by the spring tension of said ball, either in driving or releasing position.

For effecting the release of the pin 25 upon the overload causing relative rotation between the driving and driven members, shaft 13 has secured thereto an unloading member in the form of the cam 29. Said member is secured adjacent the head 12 of the driven member. Slidably mounted in the head 12 immediately below and in line with the releasable driving pin 25 there is a retracting pin 30 fixedly secured at one end in the head 25 of said driving pin. The opposite end of the retracting pin 30 extends into the path of movement of the camming face of the unloading member 29 for engagement thereby, such as to cam said pin outwardly. The retracting pin 30 is cammed outwardly by the unloading member, under a torque that is only a small fraction of the total torque load, and carries with it the driving pin 25 to disengage the energizing end of the clutch spring 22. Thereupon the clutch spring will return to its normal disengaging position with respect to the pocket 11 under its inherent spring tension. Thus, the driven member will be released from the driving action of the driving member. Said members will remain released from their driving connection until the driving pin is manually pressed forward into its driving position upon the overloading condition being corrected.

At rest the clutch spring 22 will be in its normal contracted position free from clutching engagement with the pocket 11. The load sensitive element 14 will have returned to its unloaded position and the driving pin 25 will have been pushed to its forward position for engagement with the energizing end 24 of the clutch spring. Upon power being applied to the shaft 13, thus starting rotation of the clutch spring 22, the driving pin will energize and expand the clutch spring into clutching engagement with the pocket 11 and cause the driving torque to be transmitted thereto by the load carrying flange 19 of the load sensitive element 14. Said element being keyed to the shaft 13, will complete the power transmission thereto. In event of overloading or predetermined torque resistance being reached in the driving action, or resistance through the key 18 to the load sensitive element with power being applied to the abutting end 20 of the load carrying flange, said element will yield and expand sufficiently to permit of a slight relative movement between the driving and driven members. This movement will carry the retracting pin over the face of the unloading cam member 29. It will thereby be forced to retracted position and carry with it the driving pin 26 out of engagement with the energizing end 24 of the clutch spring. The clutch spring will then contract to its normal condition free of clutching engagement with the pocket 11 so as to disengage the driving connection. After the overloading condition has been remedied, the driving pin may be manually returned to its driving position for energizing the clutch spring into clutching engagement upon torque being applied in the manner above described.

Although there is illustrated herein a clutch spring that expands into clutching engagement with its coacting member, the same releasing action can be secured by employing a unit in which the clutching action is produced by contracting the clutch spring into clutching engagement with a driven stud member to transmit the torque load.

The invention claimed is:

1. An overload release device including a driving member, a driven member, one of said members being provided with a clutch engaging surface, a clutch spring normally out of clutching engagement with said surface, a slidable driving pin mounted on said member slidable into energizing position for engagement with one end of said spring for moving said spring into clutching engagement with said surface upon torque being applied to one of said members, a load sensitive element operatively connecting the other end of said spring with the other of said members to yieldingly permit relative angular movement of said members upon an overload being applied thereto, an unloading cam on said last-mentioned member, and a retracting pin on said first-mentioned member operatively associated with said driving pin, said retracting pin being engageable by said unloading cam upon said relative angular movement of said members to retract said driving pin from energizing engagement with said spring.

2. An overload release device including a driving member, a driven member, one of said members being provided with a clutch engaging surface, a clutch spring normally out of engagement with said clutch engaging surface and movable into clutching engagement therewith for effecting driving relation between said members, a manually slidable energizing pin mounted in said driving member and manually slidable into position to engage with and energize said clutch spring into clutching engagement with said surface upon torque being applied to said driving member, a cam surface on said driven member positioned to operably engage and retract said energizing pin out of its energizing position, and a latch engageable with said pin for yieldingly retaining it in or out of its said energizing position.

3. An overload release device including a driven member provided with a pocket having an internal clutch surface, a driving member extending into said pocket concentrically therewith, a load sensitive split sleeve keyed to said driving member, a clutch spring surrounding said sleeve having its load carrying end in abutment therewith, said spring being normally out of clutching engagement with said pocket, an energizing pin manually slidable on said pocket into position for engagement with the energizing end of said spring for expanding said spring into clutching engagement with said pocket upon torque being applied to said driving member, a retracting pin carried by said energizing pin, and a cam on said driving member for camming engagement with said retracting pin upon relative angular displacement of said members resulting from an overload expanding said split sleeve.

4. An overload release device including a driven member provided with a pocket having an internal clutch surface, a driving member extending into said pocket concentrically therewith, a load sensitive split sleeve keyed to said driving member, a clutch spring surrounding said sleeve having its load carrying end in abutment therewith, said spring being normally out of clutching engagement with said pocket, an energizing pin manually slidable on said pocket into position for engagement with the energizing end of said spring for expanding said spring into clutching engagement with said pocket upon torque being applied to said driving member, a retracting pin carried by said energizing pin, a cam on said driving member for camming engagement with said retracting pin upon relative angular displacement of said members resulting from an overload expanding said split sleeve, and a latch on said pocket in yielding engagement with said energizing pin for latching it into and out of its energizing position.

5. An overload release device including a driving member and a driven member in coaxial telescopic relation with each other, one of said members being provided with a clutch drum surface, a clutch spring interposed between said members normally free of clutching engagement with said drum surface and adapted to be energized into clutching engagement therewith, said spring having an energizing end and a load carrying end, a torque sensitive element interposed between the load carrying end of said spring and the other said member, an energizing pin slidable on the first-mentioned member into position for engagement with the energizing end of said spring for energizing it into clutching engagement with said drum upon torque being applied to the driving member, a retracting pin operably connected with said energizing pin, and a cam on the other said member for camming engagement with said retracting pin upon relative angular displacement of said members resulting from an overload applied to said load sensitive element.

WILLIAM CARLETON STARKEY.

REFERENCES CITED

The following references are of record in the file of this patent:

UNITED STATES PATENTS

| Number | Name | Date |
| --- | --- | --- |
| 2,289,884 | Raber | July 14, 1942 |
| 2,487,280 | Starkey | Nov. 8, 1949 |